(12) United States Patent
Cofta

(10) Patent No.: US 7,320,072 B1
(45) Date of Patent: Jan. 15, 2008

(54) METHOD AND TOKEN FOR AUTHENTICATING A CONTROL POINT

(75) Inventor: Piotr Cofta, Arlington, MA (US)

(73) Assignee: Nokia Corporation, Espoo (FI)

( * ) Notice: Subject to any disclaimer, the term of this patent is extended or adjusted under 35 U.S.C. 154(b) by 721 days.

(21) Appl. No.: 09/648,449

(22) Filed: Aug. 28, 2000

(51) Int. Cl.
*H04L 9/00* (2006.01)
*G06Q 20/00* (2006.01)
*G06Q 30/00* (2006.01)
*G07G 1/10* (2006.01)
*G07G 1/12* (2006.01)
*G06G 1/12* (2006.01)

(52) U.S. Cl. ............ 713/169; 713/168; 705/16; 705/18; 705/21; 705/25; 705/26

(58) Field of Classification Search ........ 713/201, 713/172, 169; 705/41, 16
See application file for complete search history.

(56) References Cited

U.S. PATENT DOCUMENTS

| | | | | |
|---|---|---|---|---|
| 4,454,414 A * | 6/1984 | Benton | .......... | 705/41 |
| 4,731,841 A * | 3/1988 | Rosen et al. | ........ | 713/159 |
| 4,827,113 A * | 5/1989 | Rikuna | .......... | 235/432 |
| 5,036,461 A * | 7/1991 | Elliott et al. | ........ | 705/41 |
| 5,557,518 A | 9/1996 | Rosen | | |
| 5,796,832 A * | 8/1998 | Kawan | .......... | 705/65 |
| 5,878,142 A * | 3/1999 | Caputo et al. | ........ | 713/159 |
| 5,995,624 A | 11/1999 | Fielder et al. | | |
| 6,088,450 A | 7/2000 | Davis et al. | | |
| 6,307,956 B1 * | 10/2001 | Black | .......... | 382/124 |
| 6,463,534 B1 * | 10/2002 | Geiger et al. | ........ | 713/168 |
| 6,584,309 B1 * | 6/2003 | Whigham | ........ | 455/414.1 |
| 7,149,895 B1 * | 12/2006 | Asokan et al. | ........ | 713/159 |

FOREIGN PATENT DOCUMENTS

| | | |
|---|---|---|
| EP | 0 924 657 A2 | 6/1999 |
| WO | 98-34203 | 8/1998 |
| WO | 99-01990 | 1/1999 |

\* cited by examiner

*Primary Examiner*—Benjamin E. Lanier
(74) *Attorney, Agent, or Firm*—Banner & Witcoff, Ltd (57) ABSTRACT

A method is provided for authenticating an action between a control point and a user. A token which performs authentication is presented to the control point. The control point may be authenticated by using the token. The token may include a communication portion that obtains information regarding the control point and that communicates with a token issuer to authenticate the control point based on the information. A user interface portion may be coupled to the communication portion to indicate a result of the authentication to a user.

17 Claims, 6 Drawing Sheets

METHOD AND TOKEN FOR AUTHENTICATING A CONTROL POINT

FIELD OF THE INVENTION

The present invention generally relates to a method and apparatus for authenticating an action. More particularly, the present invention relates to a method and token for authenticating a control point in a transaction or action.

DESCRIPTION OF RELATED ART

Financial transactions such as payment at a point of sale (POS) or the dispensing of monies at an ATM machine often include authorization of the user or purchaser by the entity providing the service, payment or object desired. The user or purchaser must often present identification for the authentication such as a card (e.g. a credit card or debit card) or a badge in order for the entity to authorize a particular action. The entity (e.g., merchant) may then verify the identity of the user through information that is then conveyed by the card, badge or other structure presented by the user. For example, a purchaser may provide a credit or debit card to a merchant who runs it through a card scanner to read out financial identification (ID) associated with the card. The financial ID and the cost of the goods or services may be forwarded over a telephone network (such as the public switched telephone network) to the bank or other entity providing the credit for the credit card or maintaining the money associated with the debit card. The bank verifies that there is sufficient credit or debt capacity for the transaction and forwards verification to the merchant. The consumer then is typically asked to sign a receipt for the purchase and the transaction is thereby completed and the goods or services are conveyed to the consumer. However, in these transactions, the user or purchaser must trust the entity to which he or she is presenting an identification card or badge. The entity to whom the user or purchaser presents identification may be a fraudulent entity and may steal vital data or monies from the user or purchaser.

Under current methods, the user or purchaser is unable to verify the authenticity of the entity other than observing the brand name, label or name of the entity. Any uncommon occurrence such as a malfunction at the entity makes the user feel uncomfortable.

Secure electronic transactions (SET) have recently been used for secure credit card payments over the Internet. In a remote payment SET, both the purchaser and the merchant may entrust the same organization to perform an off-line verification process. This off-line verification process may be in the form of cryptographic data exchange between the purchaser and the merchant. However, secure electronic transactions do not address other aspects of the payment and assume that the purchaser is satisfied with the off-line authentication of the digital certificate that is presented by the merchant. It is desirable to obtain further authentication of merchants.

SUMMARY OF THE INVENTION

A method is provided for authenticating (or verifying) an action (e.g. financial action, access control, ticketing, and toll collecting) between a control point and a user. The method may involve presenting a token to the control point and authenticating the control point using the token.

The authentication may occur on-line between the token and a token issuer that issued the token to the user.

The token may be a mobile communication device that communicates with the token issuer using a wireless communication path. The token may also communicate with the token issuer using a communication network of the control point. The control point may also authorize the action based on information provided by the token.

A token may be provided for authenticating a control point. The token may include a communication portion that obtains information regarding the control point and that communicates with an external entity (e.g., a token issuer) to authenticate the control point based on the information. A user interface portion may be coupled to the communication portion to indicate a result of the authentication to a user.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

The present invention relates to authentication of an action between a user (e.g., a purchaser) and a control point (e.g., a device operated by a merchant) as will be described below. This may include such activities as payment at a point of sale (POS), authentication at an ATM machine, access control (e.g., doors), ticketing, toll collection and other similar types of actions. Embodiments of the present invention allow a user to authenticate an entity (hereafter referred to as a control point) on-line with the aid of supporting infrastructure. For example, an authenticating device (hereafter referred to as a token) may communicate with its own supporting and trusted infrastructure to perform the authentication. The infrastructure may help authenticate the control point for the user and authorize the action. By allowing for such verification, the user may make sure that to the best knowledge of the token issuer, the control point is valid and the interaction is secure. This may effectively disable fraudulent control points as each point can be verified by the user based on the trusted infrastructure. Interactions between the user and the control point may be verified and authorized not only from the control point side but also from the user side as well.

Figure 1:
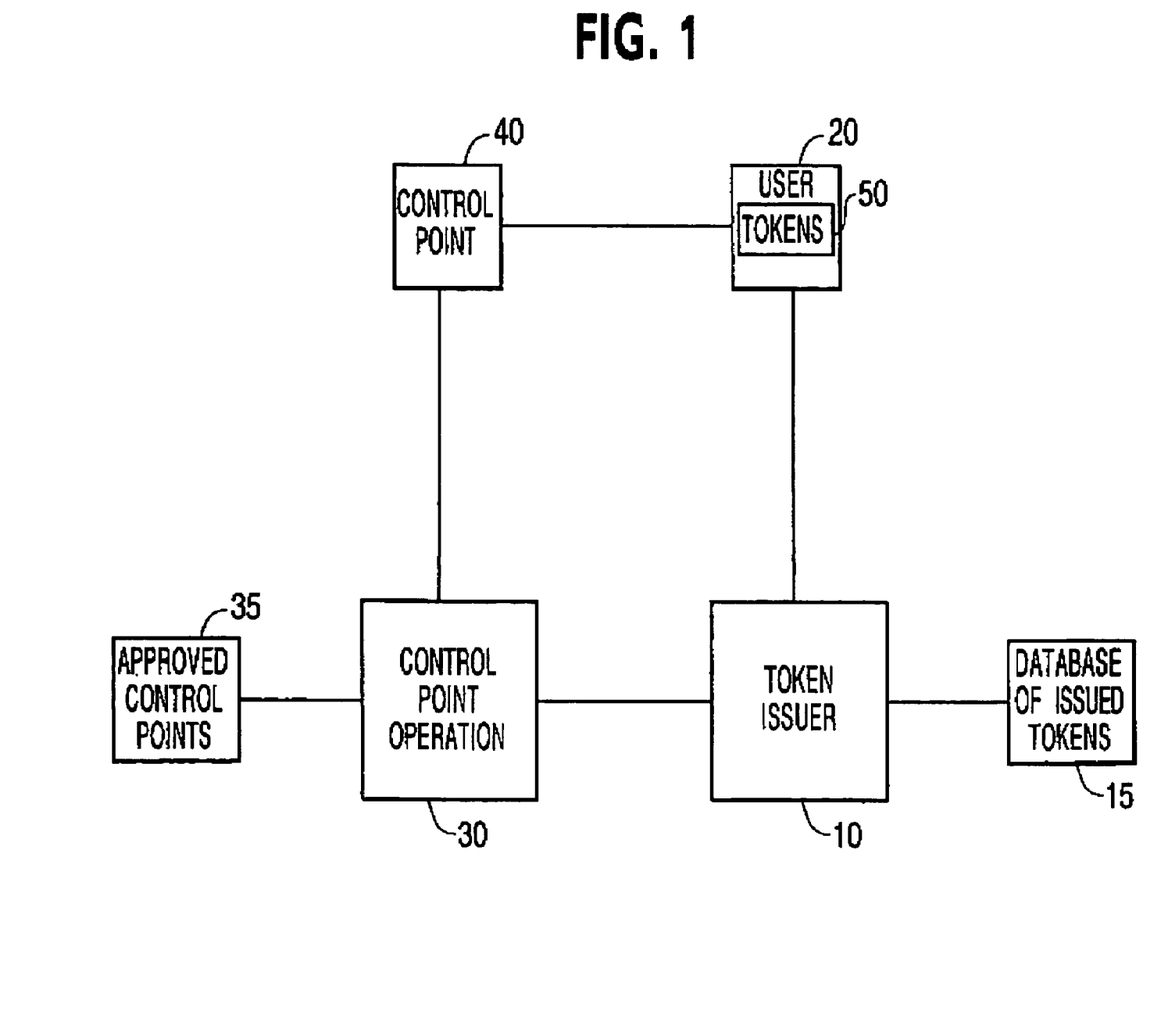
FIG. 1 is a block diagram of entities involved in a financial transaction.

FIG. 1 shows entities involved in an example action such as a financial transaction. Other entities (not shown) may also be involved. FIG. 1 shows a token issuer 10 that issues a token 50 to a user 20 (such as a purchaser). FIG. 1 specifically shows the user 20 in possession of the token 50. The token issuer 10 may be a bank, credit union, security agency, etc. that is responsible for issuing tokens that will be presented to entities (i.e., control points) in order to perform an action. The token issuer 10 may be associated with a database of issued tokens 15 to store information and data about the tokens and users. FIG. 1 also shows a control point operator 30 that approves control points such as a control point 40. The control point operator 30 may also be associated with a database of approved control points 35 to store information and data about the control points. The control point 40 may be any device or entity that is approved by the control point operator 30 to authenticate the user. The control point 40 may be operated by a merchant. The control point operator 30 may be an entity such as a bank, credit union or security agency that approves control points and provides means to authenticate the users and tokens. The token 50 may be a device that allows the user 20 to authenticate himself to the control point 40. Further, the user 20 may be a person or entity that has been granted the token 50 by the token issuer 10 and is authorized to use the token 50 at the control point 40.

Figure 2:
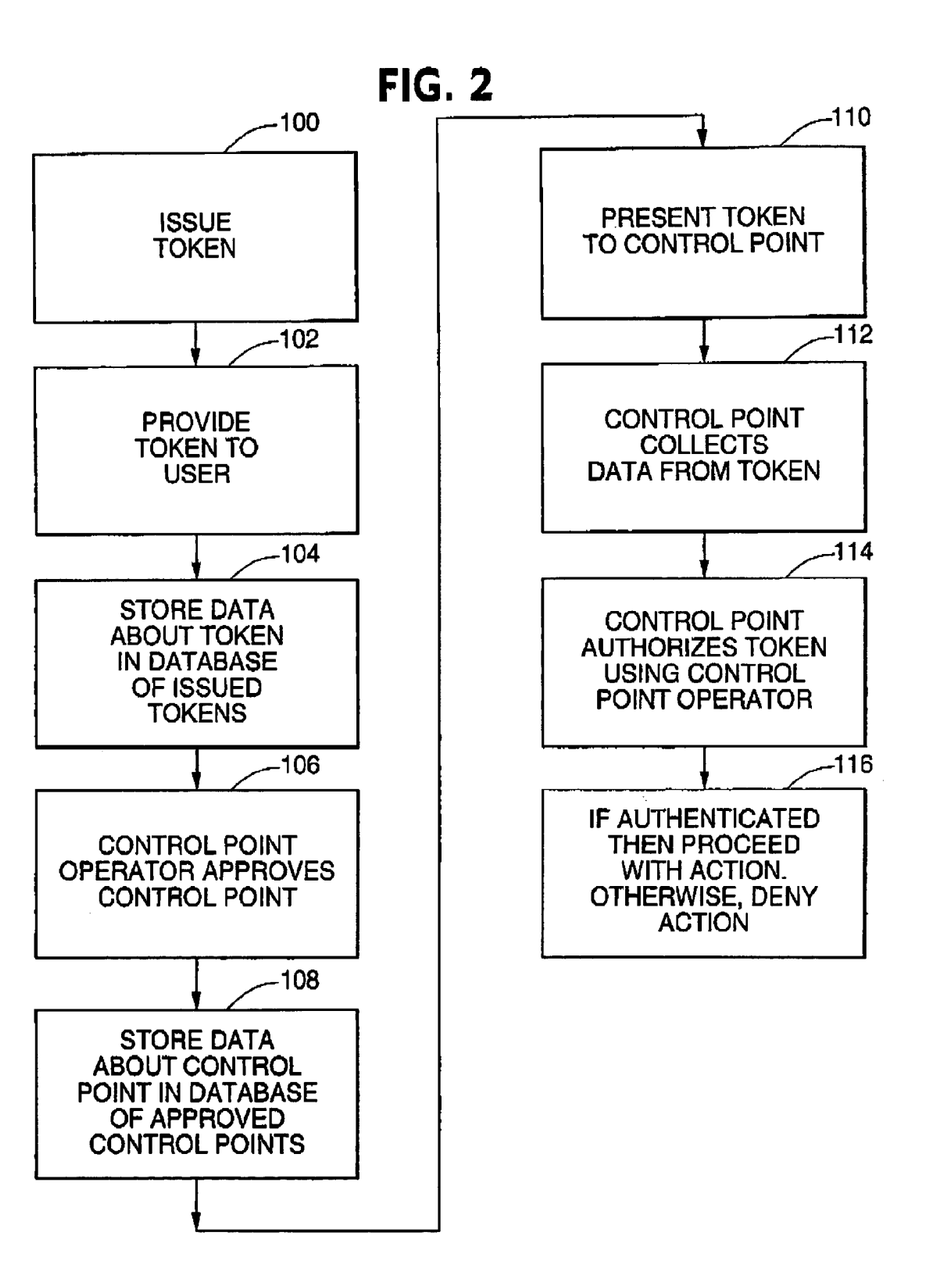
FIG. 2 is a flow chart showing one example of authorizing an action.

FIG. 2 shows one example of how a control point may authenticate a user. This figure will be described with respect to the entities that are shown in FIG. 1. As shown in FIG. 2, the token issuer 10 issues the token 50 in block 100. The token 50 is provided to the user 20 in block 102. The token issuer 10 may store data about the token 50 in the database of the issued tokens 15 in block 104. The control point operator 30 may approve the control point 40 in block 106 and subsequently store data about the control point 40. In the database of approved control points 35 in block 108. In order to perform a particular action, the user 20 may present the token 50 to the control point 40 in block 110. The control point 40 may collect data (i.e., identification number or mother's maiden name) from the token 50 in block 112. The control point 40 may also interact with the control point operator 30 to authenticate the user 20 in block 114. The authentication may involve reviewing and comparing data from the token 50 with data stored in one of the databases 15, 35. If the control point operator 30 or the control point 40 authenticates the token 50, then the control point 40 may proceed with the respective action in block 116. Otherwise, the control point 40 may deny the action. In order to authenticate the tokens as being legitimate, the token issuer 10 may make the database of issued tokens 15 available to the control point operator 30.

Figure 3:
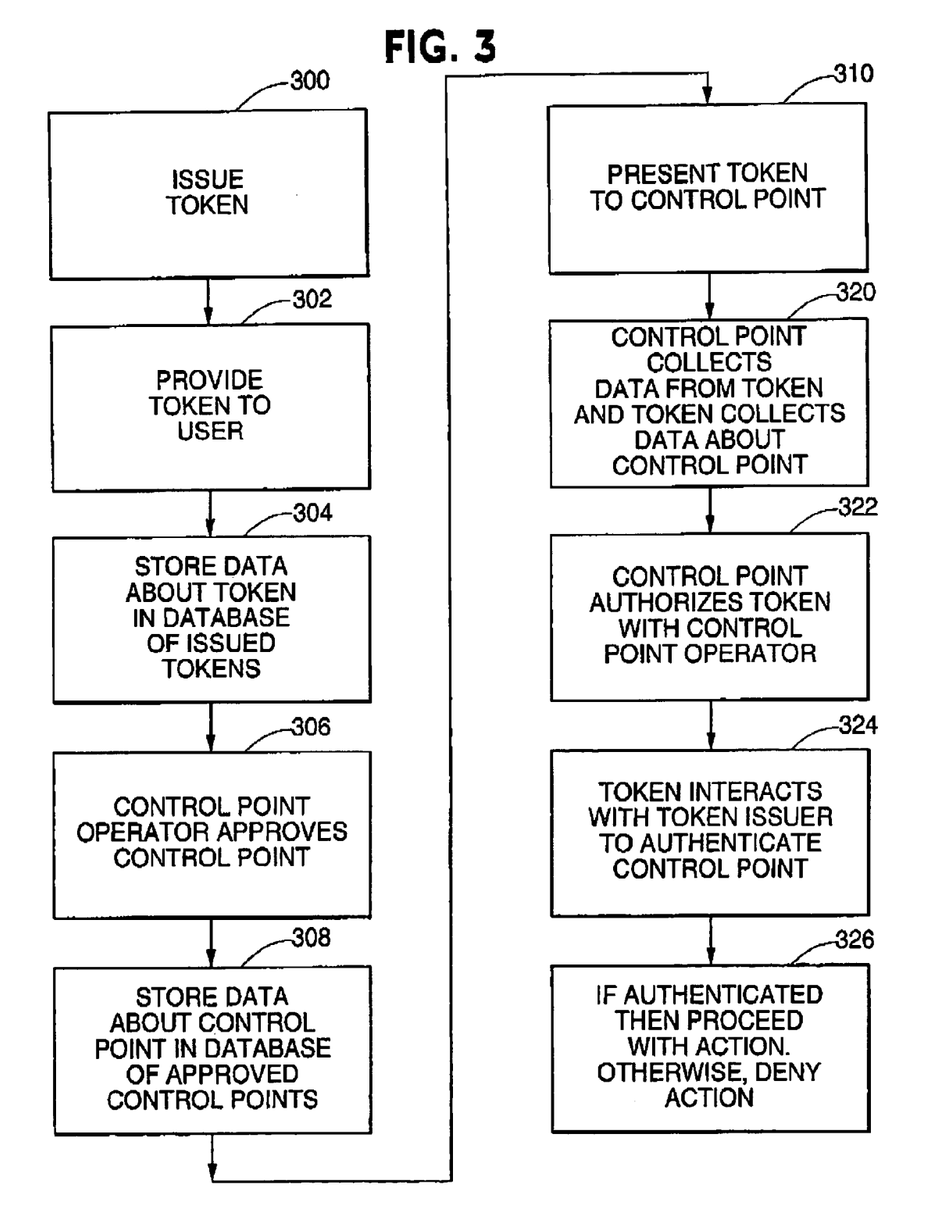
FIG. 3 is a flow chart showing an example embodiment of authorizing an action according to the present invention.

FIG. 3 shows a flow chart of an authenticating method according to an example embodiment of the present invention. This flow chart is merely one example embodiment as other embodiments are also within the scope of the present invention. Further, the order of the respective blocks of FIG. 3 is merely illustrative as the order of the operations may differ in accordance with the present invention. The flow chart FIG. 3 will be described with respect to the entities that are shown in FIG. 1.

The token issuer 10 may issue the token 50 in block 300 and provide the token 50 to the user 20 in block 302. The token issuer 10 may store data (e.g., identification numbers or mother's maiden name) about the token 50 in the database of issued tokens 15 in block 304. The control point operator 30 may approve the control point 40 in block 306 and store data about the control point 40 in the database of approved control points 35 in block 308. In accordance with the present invention, the operations in blocks 306 and 308 may occur before, during or after the operations in blocks 300, 302 and 304.

The user 20 may present the token 50 to the control point 40 in block 310. The control point 40 may collect data from the token 50 in block 320. The token 50 or its underlying structure may also collect data from the control point 40 in block 320. The collected data may be any type of data that may be used to authenticate another entity. The control point 40 may interact with the control point operator 40 to authorize the user (and token) in block 322. The token 50 may interact with the token issuer 10 to authenticate the control point 40 in block 324. This authentication may occur on-line between the token 50 and the token issuer 10. The token 50 or its underlying structure may utilize the collected data regarding the control point 40 to determine if the control point 40 is a proper or legitimate entity. If the token 50 authenticates the control point 40 and if the control point 40 authenticates the token 50, then the transaction or action may properly proceed in block 326. If both the authentications do not occur, then the action or transaction may be denied.

In accordance with the present invention, the order of the control point collecting data from the token and the token collecting data from the control point may be different than that shown in FIG. 3. Further, the order of the control point authorizing the token and the token authorizing the control point may be different than that shown in FIG. 3. That is, other orders of these operations are also within the scope of the present invention.

The token 50 may be of different forms as will be described below. The token 50 or the structure to which it is attached may include electronic equipment to communicate with both the user 20 and the token issuer 10. In order for the token issuer 10 to authenticate the control point 40, the database of approved control points 35 is made available for the token issuer 10. That is, the token issuer 10 may obtain information regarding the control point 40 from the database 35. Communication may occur between the token issuer 10 and the control point operator 30 in order to exchange the contents of the database of issued tokens 15 and the database of approved control points 35. The token 50 or the structure to which it is attached may interact with the token issuer infrastructure, such as the token issuer 10, so that the data collected by the token 50 from the control point 40 can be authenticated on-line using data from the database of approved control points 35.

Communication and exchange of data between the token 50 and the control point 40 may be conducted by several different types of methods including but not limited to local communication (e.g. Bluetooth) or remote communication such as the Internet. The token 50 may employ the necessary communication equipment to access the token issuer infrastructure by using GPRS or other types of wireless networks.

In one example embodiment, the control point 40 may communicate with the control point operator 30 across a normal communications link or direct connection. The token 50 may communicate with token issuer 10 using a wireless communication network or a direct connection. Further, the token issuer 10 may communicate with the control point operator 30 across a normal communications link or direct connection.

Figure 4:
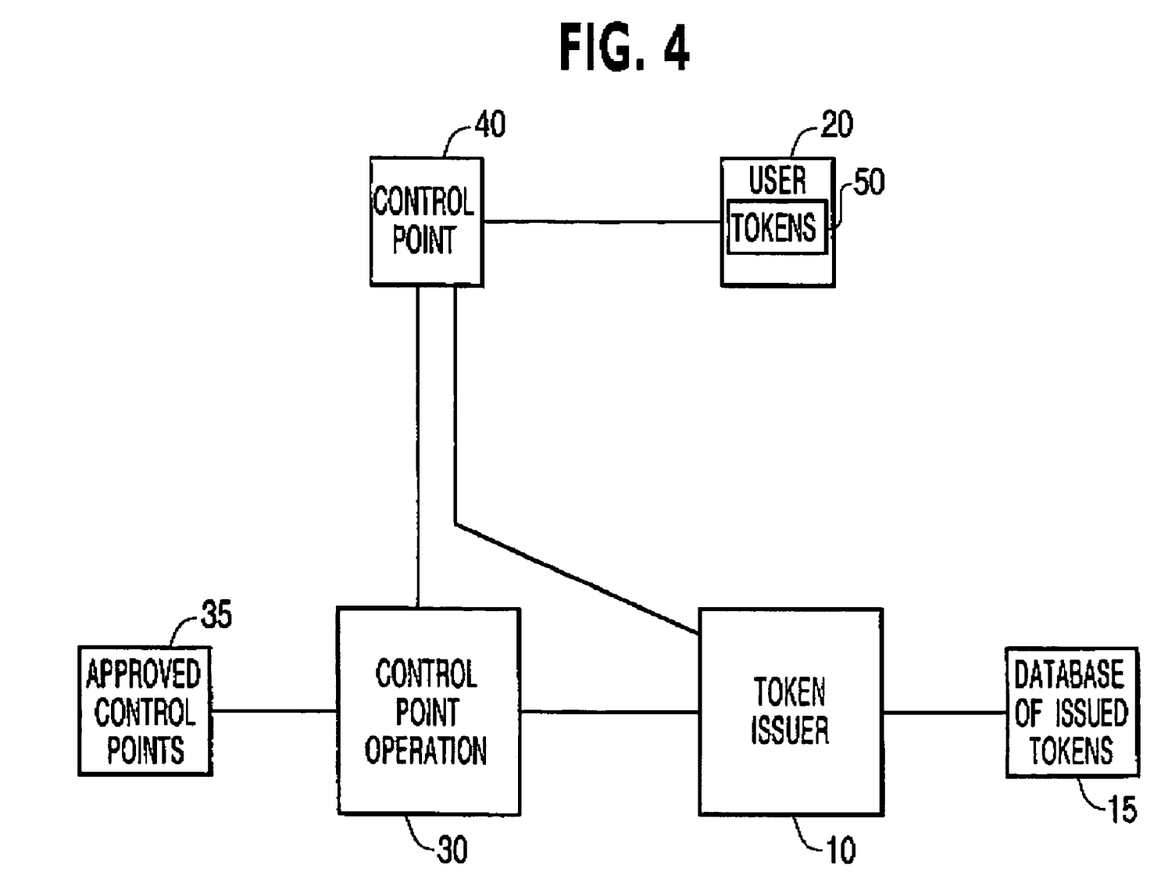
FIG. 4 shows an alternative way of communicating between the token and the token issuer according to an example embodiment of the present invention.

FIG. 4 shows an embodiment in which the token 50 may use the communications network of the control point 40 in order to communicate on-line with the token user 10. That is, the token 50 may communicate with the token issuer 10 by using the same communication network that the control point 40 uses to communicate with the control point operator 30. In such circumstances, the token 50 should establish a secure and reliable communication channel through the possibly hostile network of the control point 40.

Figure 5:
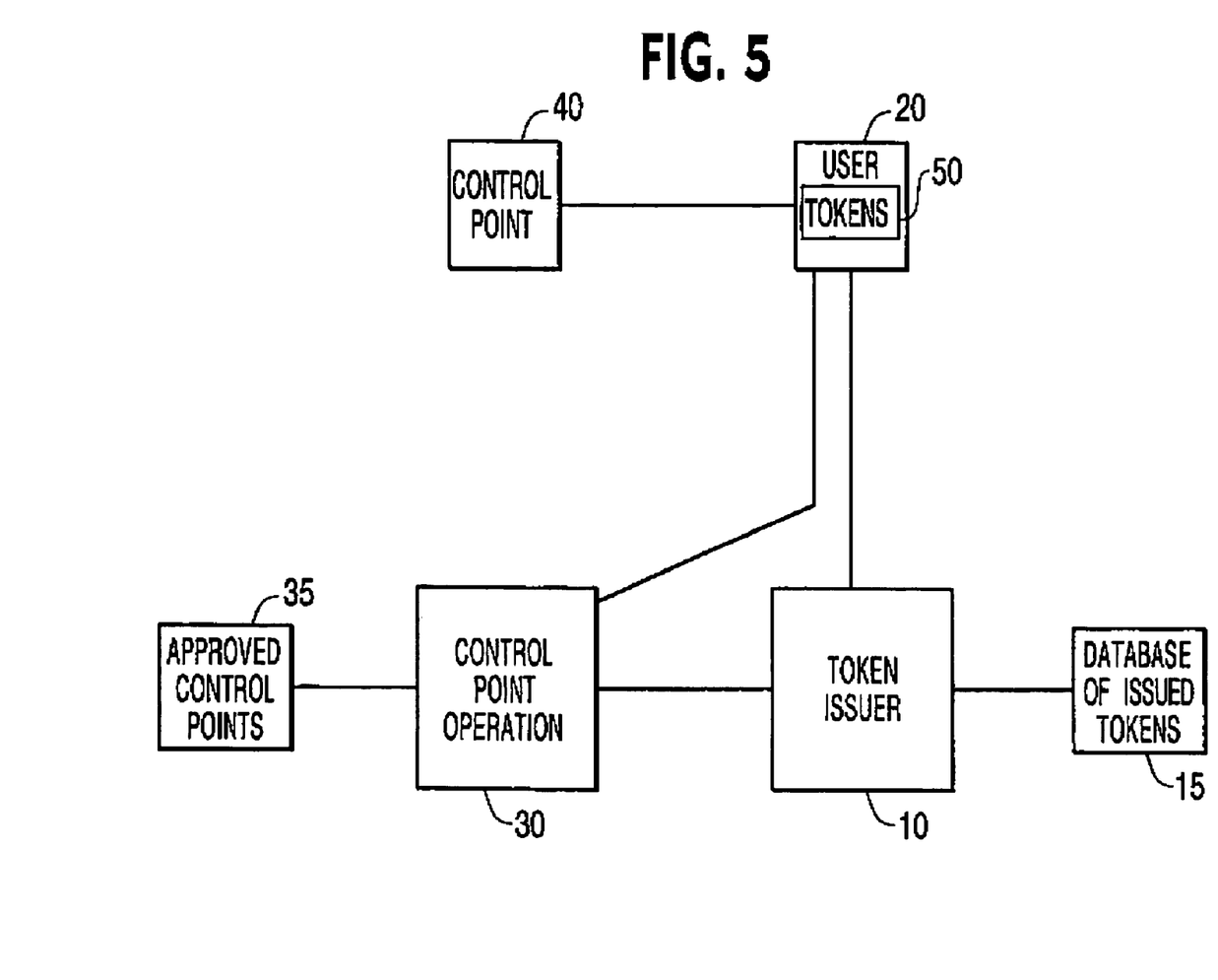
FIG. 5 is an alternative way of communicating between the control point and the control point issuer according to an example embodiment of the present invention.

FIG. 5 shows an embodiment in which the control point 40 may use the communications network of the token 50 and the token issuer 10 in order to communicate with the control point operator 30. That is, the control point 40 may communicate with the control point operator 30 using the same communication network that the token 50 uses to communicate with the token issuer 10.

Figure 6:
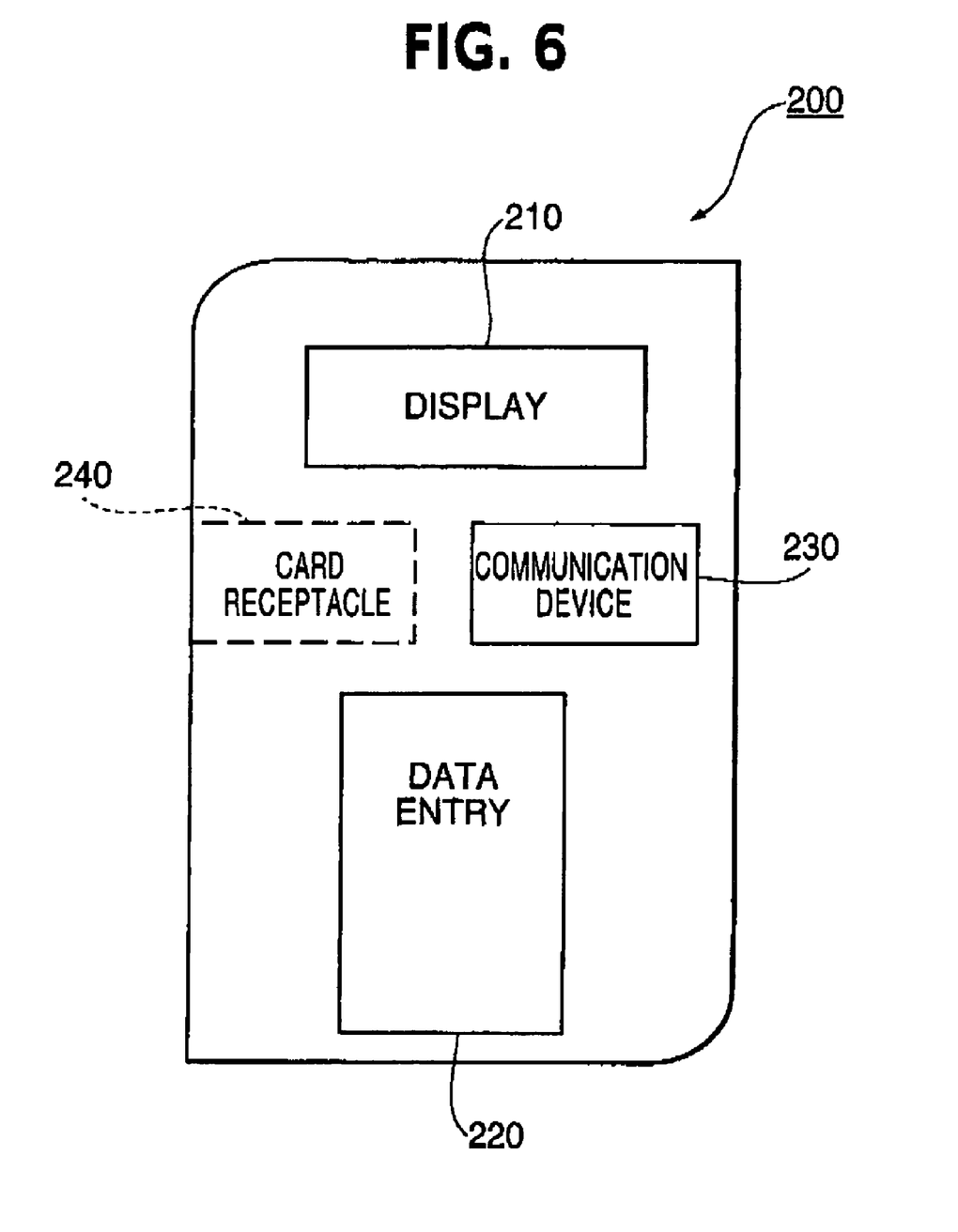
FIG. 6 is a mobile communication device according to an example embodiment of the present invention.

FIG. 6 shows one embodiment of a token in which the token 50 is a mobile communication device 200. The token 50 may also be a part of the mobile communication device. The mobile communication device 200 may include a display device 210 and a data entry portion 220 such as a keypad. The mobile communication device 200 may further include a communication portion 230 and a portion 240 which is fitted within the mobile communication device 200 and adapted to receive a smart card or similar type of device containing data. The display device 210 may visually display information such as whether the control point is authenticated or denied. The mobile communication device 200 may also include a speaker (not shown) to make an audible sound authorizing or denying the control point 40. The communication device 230 may communicate over a wireless network with the token issuer 10 or may be connected by a direct communications link to the token issuer 10. The communication device 230 may be coupled by a direct communications link with the control point 40. The smart card may include data of the token 50 or user that will be used by the control point 40 for its authentication.

The token 50 may be a self-contained device that holds all the necessary interfaces such as the mobile communication device 200 shown in FIG. 6 fitted with local communication circuits and with a tamper-proof circuit to hold the token=s data. The token 50 may also be a self-contained device such as a smart card that provides only local communication (e.g., galvanic contact or contactless) and a user interface such as a display device and/or a keypad. The means by which the communication device 200 is connected and communicates with the control point 40 may be different than the means used to connect and communicate with the token issuer 10. The token 50 may also be separated from a communication device and connected to it when necessary. A smart card acting as a token may also be fitted into a mobile communication device or similar type of device. Alternatively, the token 50 may be a separate device that is coupled to the communication device (e.g., by contactless interface or Bluetooth).

Further, the token 50 may be fitted with communication facilities that can be used by the control point. Such a configuration may allow for authentication at passive control points such as door locks. The control point 40 may then establish the reliable communication with its operator and the control point may securely communicate the result of the authentication.

In accordance with the present invention, the user may be able to receive information regarding the authenticity or other characteristics of the control point. The token may be equipped with a user interface and the supporting infrastructure should be in place.

While the invention has been described with reference to specific embodiments, the description of the specific embodiments is illustrative only and is not to be considered as limiting the scope of the invention. Various other modifications and changes may occur to those skilled in the art without departing from the spirit and scope of the invention.

What is claimed is:

1. A method comprising:

obtaining information from a control point by a token, the token configured to connect to a network having a token issuer accessing a database of issued tokens and a control point operator accessing a database of approved control points, the network including a first communication pathway and a second communication pathway, said token obtaining the information from the control point via a third communication pathway;

transmitting from said token said information obtained from said control point to said token issuer via said first communication pathway and information regarding said token to said control point operator via said second communication pathway, said control point operator authenticating said token with said token issuer and said token issuer authenticating said control point with said control point operator;

receiving at said token via said first and second communication pathways said authentication of said control point and said authentication of said token;

transmitting to said control point said authentication of said token via said third communication pathway so as to authenticate an action performed at said control point by a user involving said token that was issued to the user and which is involved with the user performing the action, wherein the token is a mobile wireless communication device.

2. The method of claim 1, wherein said mobile communication device communicates with said token issuer using a wireless communication path in at least part of said first communication pathway.

3. The method of claim 1, wherein said control point authorizing said action based on authentication of said token.

4. The method of claim 1, wherein said action comprises a financial transaction.

5. The method of claim 1, wherein said authenticating comprises access control to a door, where said control point includes a door lock that controls operation of said door.

6. The method of claim 1, wherein said authenticating said control point comprises notifying said user whether said control point has authorization for said action.

7. A device comprising:

a wireless communication portion that obtains information via a first communication path regarding a control point and communicates wirelessly via a second communication path with an external entity to authenticate said control point based on said information and communicates wirelessly via a third communication path to authenticate a user to the control point to perform an action using the control point, said device having been issued to said user, said wireless communication portion configured to transmit via said first communication path authentication of said device to the control point after having been received from said network via said third communication path; and a user interface portion, coupled to said communication portion, to indicate a result of said authentication of the control point to a user, wherein the device is a mobile communication device and said communication authenticating said control point and said user device is received from over said network, with authentication of said control point from said external entity including verification of said control point with a control point operator and authentication of said device from said control point operator including verification of said device with said external entity.

8. The device of claim 7, wherein said action comprises a financial transaction.

9. The device of claim 7, wherein said action comprises access control.

10. The device of claim 7, wherein said user interface portion notifies said user whether said control point has authorization for said action.

11. The device of claim 7, wherein said user interface portion comprises a display device.

12. The device of claim 7, further comprising a card that connects with said communication portion, said card containing information regarding one of said device and said user.

13. The device of claim 7, wherein said communication portion is temporarily coupled to said device.

14. The method of claim 1, said action including collecting a toll.

15. The device of claim 7, wherein said action includes collecting a toll.

16. A method comprising:
   obtaining information from a control point by a token, the token having been issued to a user to authenticate an action performed at the control point and involving the token, the token configured to connected to a network having a token issuer accessing a database of issued tokens and a control point operator accessing a database of approved control points, said network forming a first communication pathway and a second communication pathway, said token accessing the network via a first wireless interface, said token obtaining the information via a third communication pathway using a second wireless interface of said token;
   transmitting via said first communication pathway using said first wireless interface through said network from said token said information obtained from said control point and transmitting via said second communication pathway information regarding said token, said information being transmitted to said network from said token;
   receiving at said token via said first and second communication pathways over said first wireless interface an authentication of said control point and an authentication of said token; and
   transmitting to said control point said authentication of said token via said third communication pathway using said second wireless interface,
   wherein the token is a mobile wireless communication device.

17. A method comprising:
   obtaining information from a control point by a token, the token having been issued to a user so as to authenticate an action performed at the control point, the action involving the token, the token being connectable to a network having a token issuer accessing a database of issued tokens and a control point operator accessing a database of approved control points, said network forming a first communication pathway and a second communication pathway, the token obtaining the information via a third communication pathway where the control point is local to said token;
   transmitting via said first communication pathway through said network from said token said information obtained from said control point and transmitting via said second communication pathway information regarding said token, said information being transmitted to said network from said token;
   receiving at said token via said first and second communication pathways an authentication of said control point and an authentication of said token; and
   transmitting to said control point said authentication of said token via said third communication pathway,
   wherein the token is a mobile wireless communication device.

\* \* \* \* \*